(12) United States Patent
Shimizu

(10) Patent No.: US 7,059,757 B2
(45) Date of Patent: Jun. 13, 2006

(54) LIQUID CRYSTAL DISPLAY DEVICE

(75) Inventor: Masaki Shimizu, Tochigi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/503,986

(22) PCT Filed: Jul. 2, 2003

(86) PCT No.: PCT/JP03/08443

§ 371 (c)(1),
(2), (4) Date: Aug. 10, 2004

(87) PCT Pub. No.: WO2004/008236

PCT Pub. Date: Jan. 22, 2004

(65) Prior Publication Data

US 2005/0140843 A1 Jun. 30, 2005

(30) Foreign Application Priority Data

Jul. 17, 2002 (JP) ............................. 2002-208477

(51) Int. Cl.
*A47F 3/00* (2006.01)
*F21V 7/04* (2006.01)
*H03H 9/00* (2006.01)

(52) U.S. Cl. ...................... 362/561; 362/560; 362/580; 362/235; 362/310; 362/373

(58) Field of Classification Search ................ 362/561, 362/558, 560, 235, 310, 373, 580
See application file for complete search history.

(56) References Cited

U.S. PATENT DOCUMENTS 6,871,979 B1 * 3/2005 Mai ........................... 362/241

FOREIGN PATENT DOCUMENTS

| JP | 9-171173 A | 6/1997 |
|----|------------|--------|
| JP | 10-106315 A | 4/1998 |
| JP | 11-337942 A | 12/1999 |
| JP | 2001-265234 A | 9/2001 |

* cited by examiner

*Primary Examiner*—Sandra O'Shea
*Assistant Examiner*—Sharon Payne
(74) *Attorney, Agent, or Firm*—Birch, Stewart, Kolasch & Birch, LLP

(57) ABSTRACT

A liquid crystal display device has a plurality of lamps, a light diffusion plate and/or an optical sheet, a shield portion for accommodating the lamps, the light diffusion plate and/or the optical sheet. There is a liquid crystal display panel located opposite to one side of the light diffusion plate and/or the optical sheet opposed each with the other side to the lamps. The light diffusion plate and/or the optical sheet each have a vent, and a lamp chamber formed in the lamp-accommodating side of the light diffusion plate and/or the optical sheet. There is an LCD panel chamber formed in the LCD panel-disposing side of the light diffusion plate and/or an optical sheet that communicate with each other through the vent of the light diffusion plate and/or optical sheet.

10 Claims, 8 Drawing Sheets

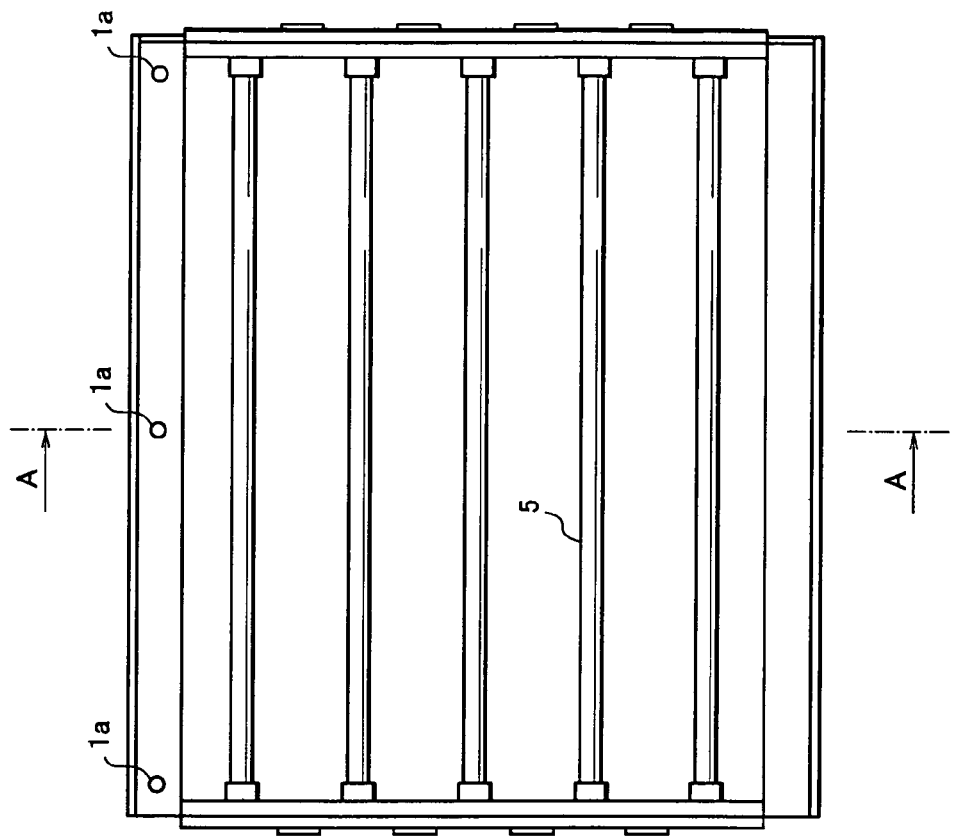
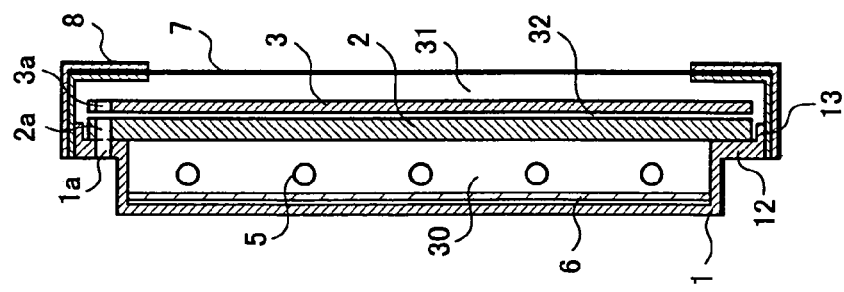

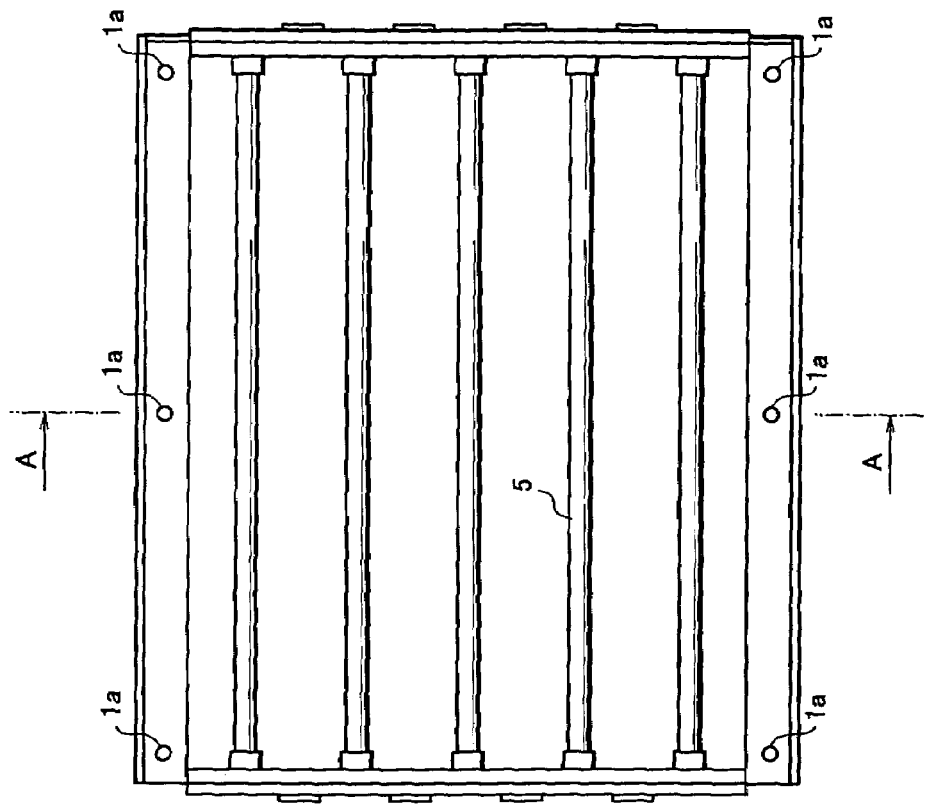
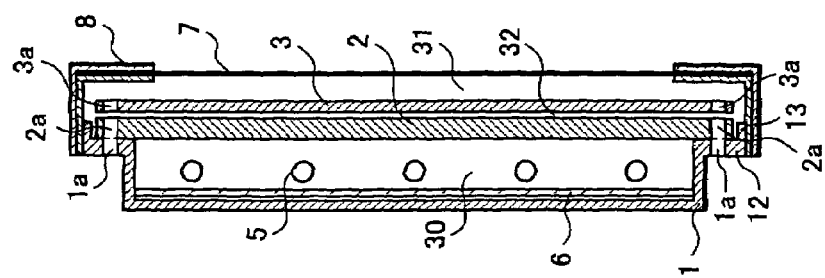

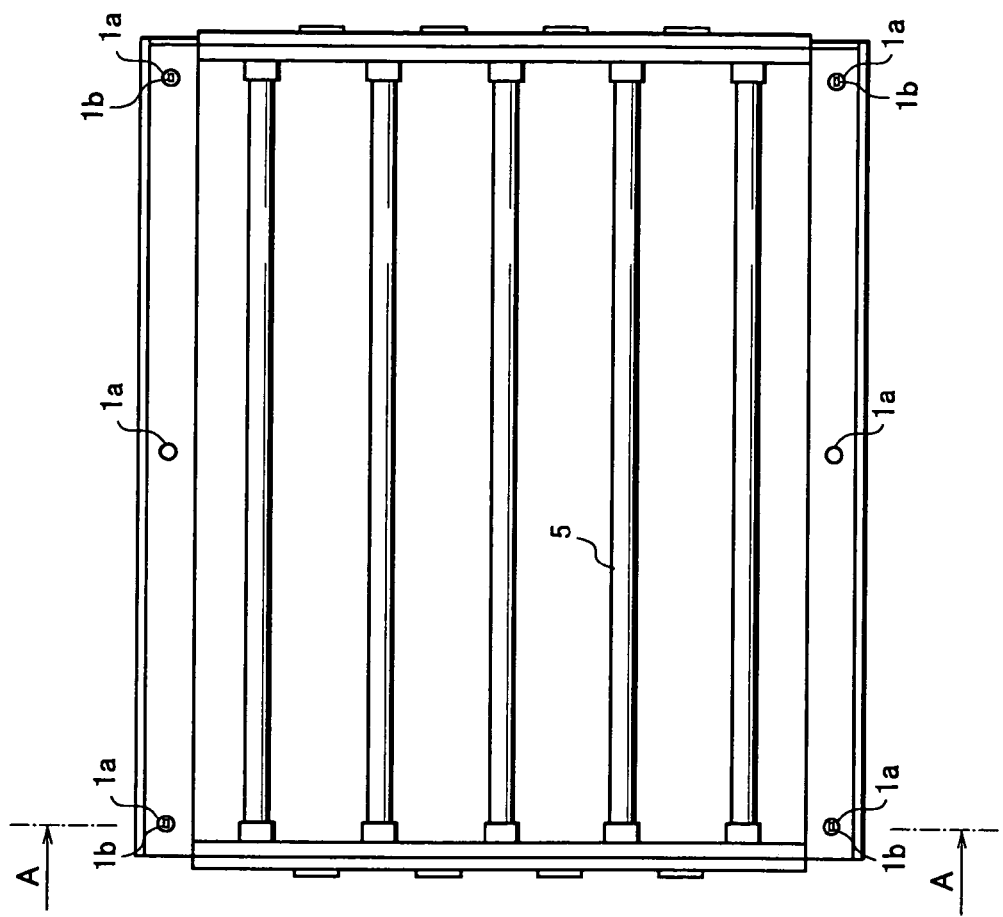
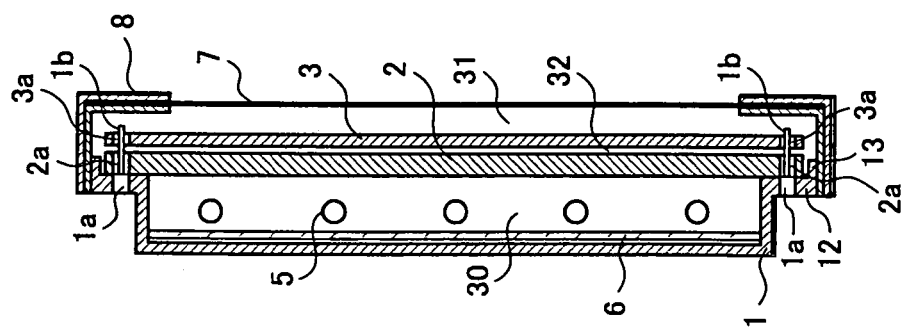

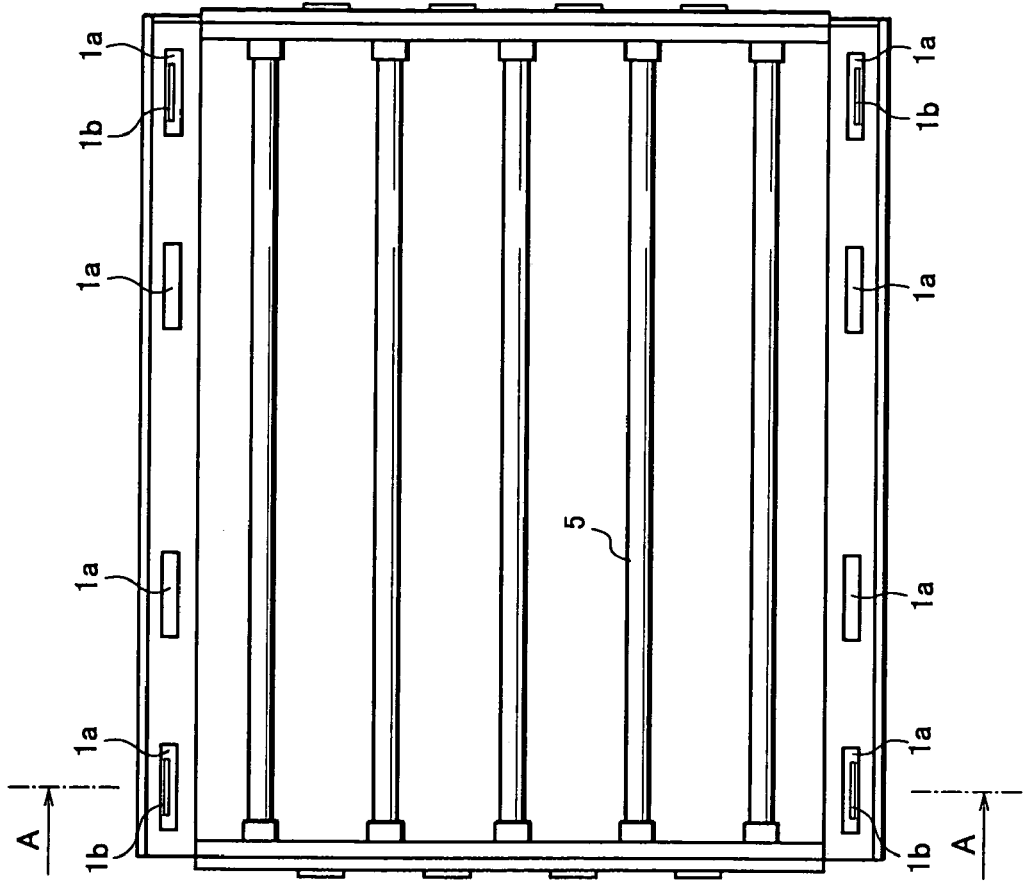
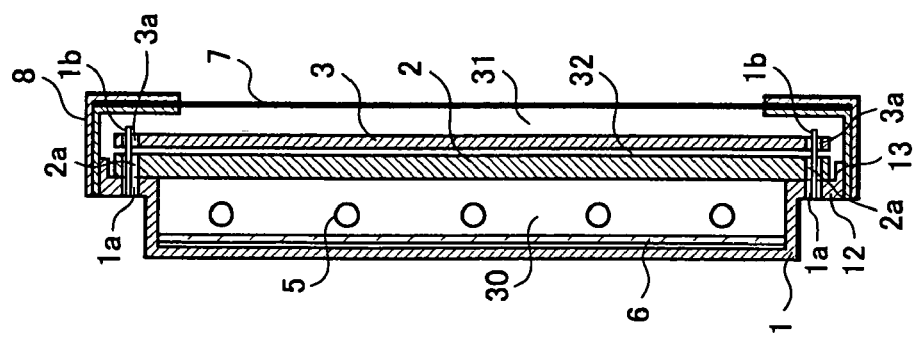

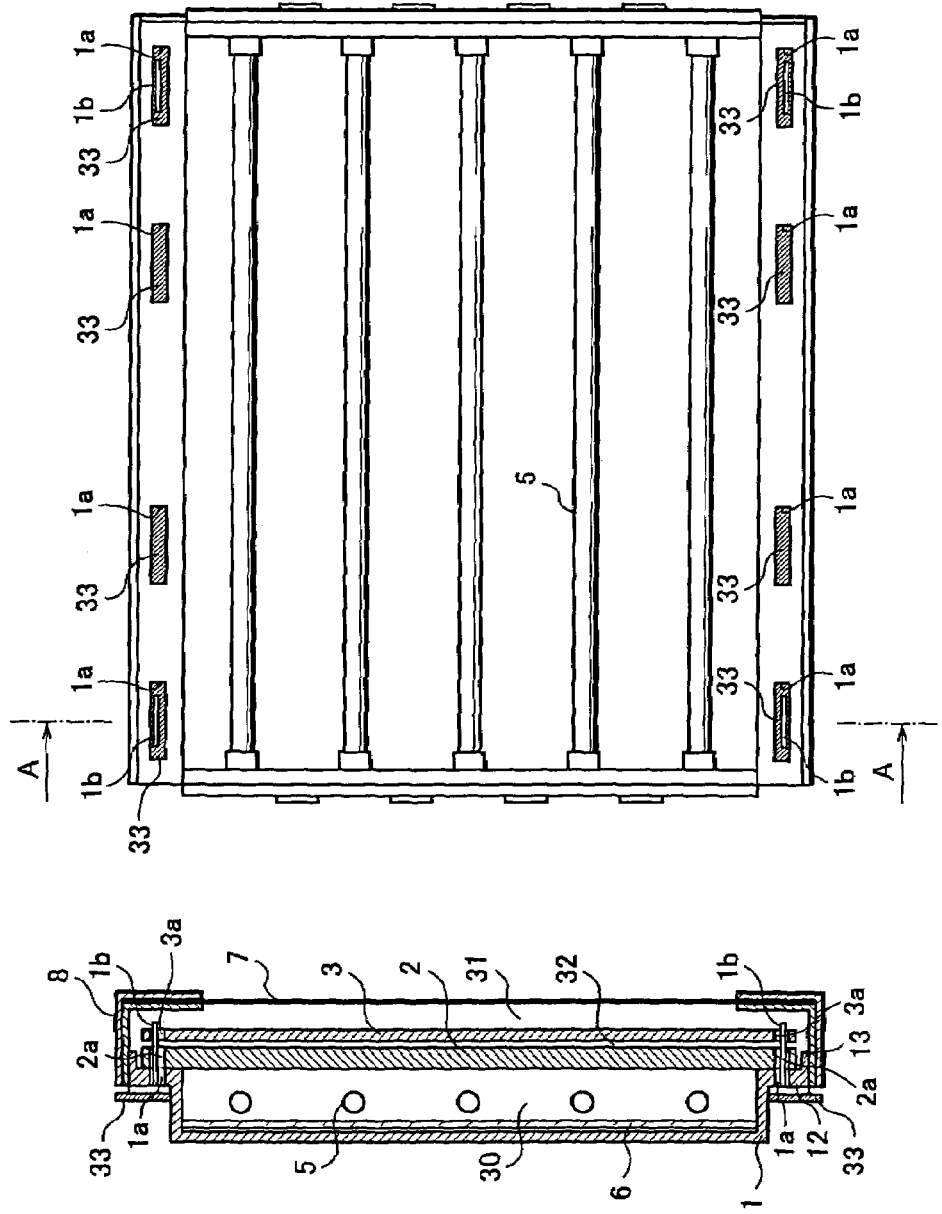

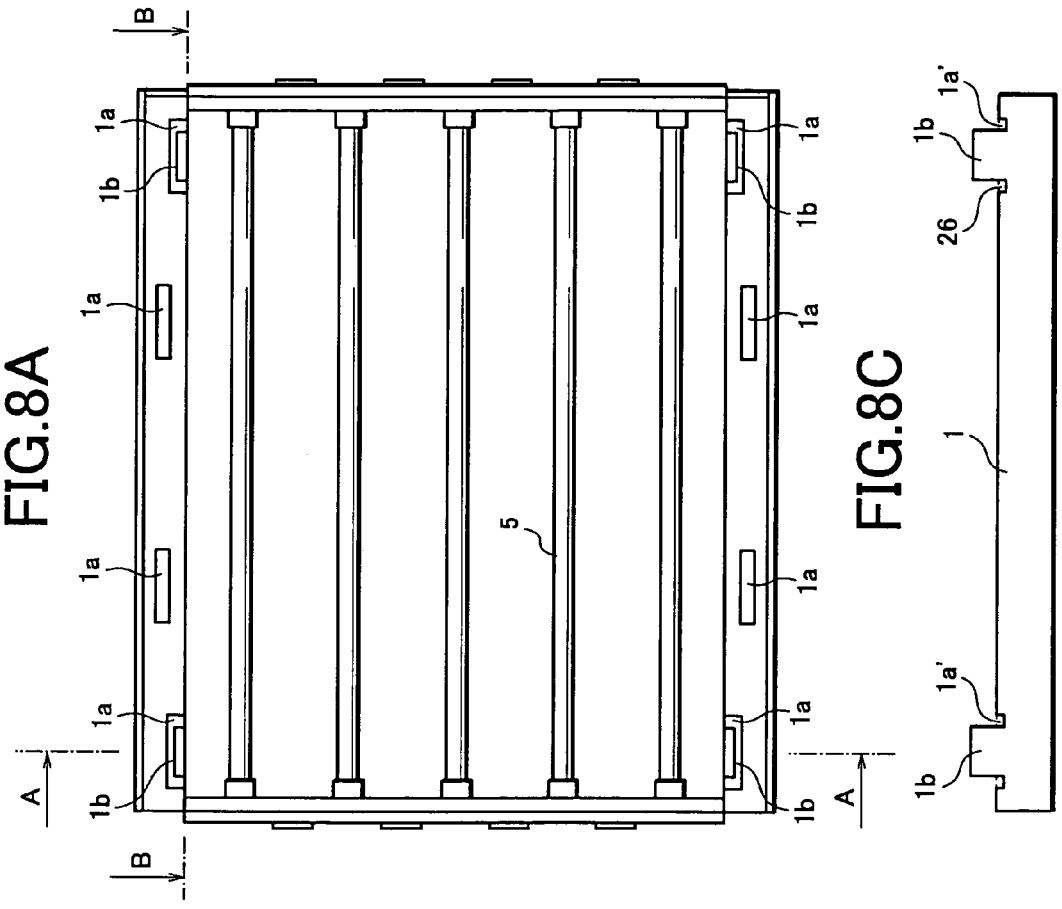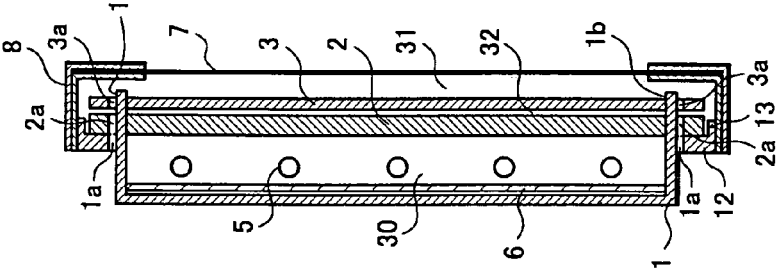

LIQUID CRYSTAL DISPLAY DEVICE

FIELD OF THE INVENTION

The present invention relates to a liquid crystal display device and more specifically to a technical method for preventing the deformation of a light diffusion plate and an optical sheet disposed ahead of backlight lamps.

BACKGROUND OF THE INVENTION

Japanese Laid-open Patent Publication No. H10-106315 discloses a conventional technical method for improving heat radiating property of a liquid crystal display device. The method disclosed in the above document is such that the LCD device body is partitioned by a reflecting plate into two chambers disposed one on the LCD panel side and one behind the reflecting plate. The LCD panel side chamber is embodied in a tightly closed structure so as to prevent penetration of dust from the outside and the backside chamber has vents through which the ambient air is introduced to flow along the one side surface of the reflecting plate to cool down the front chamber.

FIG. 1 is a construction view of a conventional liquid crystal display device. The LCD device comprises a shield portion 1, a light diffusion plate 2, an optical sheet 3, a plurality of lamps 5, a reflecting plate 6, a LCD panel 7 and so on. As shown in FIG. 1, the lamps 5 arranged in a vertical or horizontal direction on the reflecting plate 6 opposite to a whole rear surface of the light diffusion plate 2. In the horizontal direction of the LCD device (in the vertical direction of paper for the example shown in FIG. 1), the inside of the LCD device is partitioned by the reflecting plate 6 for reflecting light from the lamps 5 to form a front chamber 9 with the LCD panel 7 (front side) and a rear chamber 10 with the shield portion 1 (rear side). The front chamber 9 has airtight construction and the rear chamber 10 has a vent 11 made in the sidewall to allow the ambient air to flow therein to cool one side surface of the reflecting plate 6 and thereby to cool the front chamber 9.

Japanese Laid-open Patent Publication No. H11-337942 discloses a typical construction of a conventional light crystal display device in which a lower frame is provided at its flange with an engagement device in protrusion shape and a light diffusion plate is provided with a through hole being large enough to loosely fit therein the engagement piece of the frame. This construction can allow the expansion of the light diffusion plate and optical sheet used in the LCD device with a lighting device in high temperature environment, thereby preventing the deflection and wrinkling of the light diffusion plate and the optical sheet.

In Japanese Laid-Open Publication No. 10-106315, there is disclosed the cooling function for the front chamber by the rear chamber having vents open to the ambient air and the front chamber 9 is partitioned by the light diffusion plate 2 and the optical sheet 3 into a lamp-accommodating space and a LCD panel 7 side space. In comparison with the panel side space, the lamp-accommodating space has a higher temperature by the effect of heat from the lamps 5 arranged therein. As the temperature of the lamp-accommodating space rises, a differential pressure arises between the LCD panel side space and the lamp-accommodating space. This may cause the deformation of the light diffusion plate 2 and optical sheet 3.

Generally, there has been a rising demand for thinner LCD devices which are therefore required to be composed of components having thinner wall. Particularly, light diffusion plate, optical sheet and lamps are required to be of least thickness. However, the thinner parts may be weaker in rigidity and more deformable.

In view of the above problem, the construction of the LCD device disclosed in Japanese Laid-Open Patent Publication No. H10-106315 may not use a further thinner diffusion plate and optical sheet which may deflect or camber by the effect of heat generated from the lamps, resulting in contacting the plate and sheet with the LCD panel. In consequence of this, the LCD device becomes to have luminance unevenness.

In Japanese Laid-open Patent Publication No. H11-337942, there is disclosed a technical design for compensating thermal expansion of the light diffusion plate by providing an allowance for locating the same. However, this method does not consider the effect of differential pressure produced between the front chamber and the rear chamber partitioned by the light diffusion plate. The location of the light guiding plate behind the light diffusion plate means that the backlight is not necessarily of the direct illuminating type.

SUMMARY OF THE INVENTION

An object of the present invention is to provide a liquid crystal display device with a backlight disposed direct behind a LCD panel, which can communicate inside chambers with each other to prevent the deformation of a light diffusion plate and an optical sheet.

To achieve the above-described object, the present invention is embodied by:

a liquid crystal display device provided with a shield portion with reflecting plate for reflecting light from lamps, a light diffusion plate and/or a optical sheet arranged in the shield portion, wherein the light diffusion plate and/or the optical sheet are provided with at least a vent made in its marginal portion, the shield portion is provided with a vent for communication with the ambient air, which vent is made in position corresponding to the above vent made in the light diffusion plate and/or the optical sheet, and an air passage is formed through respective vents provided in the light diffusion plate and/or the optical sheet and the shield portion arranged to communicate the lamp accommodating chamber with the LCD panel chamber and at the same time with the ambient air;

a liquid crystal display device wherein the shield portion is provided with a protrusion integrally formed at periphery of the vent, which protrusion as a locating piece is inserted into the vent made in the light diffusion plate and optical sheet;

a liquid crystal display device wherein each of the vents provided in the light diffusion plate and/or optical sheet are a rectangular shape having long sides disposed crosswise and short sides disposed lengthwise in the upper marginal portion thereof and the vent provided in the shield portion has the same rectangular shape;

a liquid crystal display device wherein the vent made in the shield portion is provided with a filter for preventing the penetration of dust and dirt into the LCD device; and a liquid crystal display device wherein the shield portion is provided on the periphery of the vent with an protrusion formed integrally by bending up a piece cut from shield portion, which protrusion is inserted into the vents provided in the light diffusion plate and/or optical sheet to locate the same plate and/or sheet and at the same time to form a passage from the vent in the shield portion through the vents provided in the light diffusion plate and/or optical sheet for communication of the lamp chamber with the LCD panel chamber.

The LCD device provided with the above-described technical means according to the present invention can offer the following functional feature and effect.

The LCD device with a backlight disposed direct behind a LCD panel is partitioned by a light diffusion plate and/or optical sheet into a lamp chamber and a LCD panel chamber both of which communicate with each other through vents provided in the partition, thereby eliminating the possibility of occurrence of a differential pressure between two chambers, which may cause the deformation of the light diffusion plate and/or optical sheet.

The LCD device according to the present invention can achieve a uniform pressure and temperature inside and outside of the device by communicating the lamp chamber and the LCD panel chamber to the ambient air.

BRIEF DESCRIPTION OF THE DRAWINGS

FIGS. 2A and 2B show an exemplary construction of a liquid crystal display device according to an embodiment of the present invention.

FIGS. 4A and 4B illustrate another exemplary construction of a liquid crystal display device of the present invention.

FIGS. 5A and 5B illustrate another exemplary construction of a liquid crystal display device of the present invention.

FIGS. 6A and 6B illustrate another exemplary construction of a liquid crystal display device of the present invention.

FIGS. 7A and 7B illustrate a further exemplary construction of a liquid crystal display device of the present invention.

FIGS. 8A, 8B and 8C illustrate a still further exemplary construction of a liquid crystal display device of the present invention.

PREFERRED EMBODIMENTS OF THE INVENTION

Figure 1:
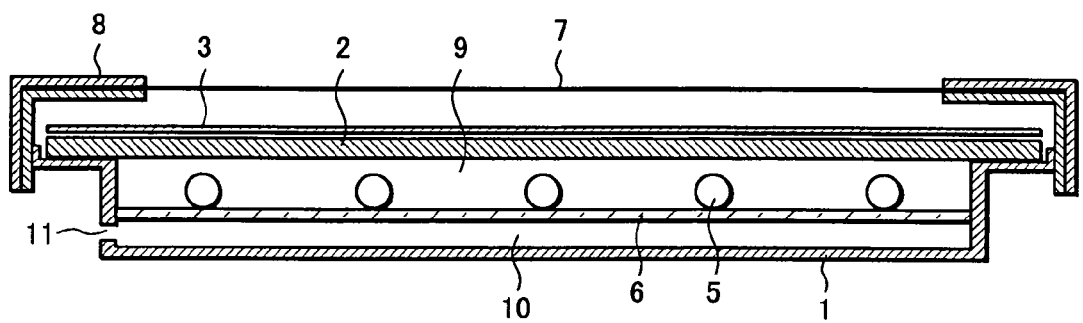
FIG. 1 shows a typical construction of a conventional liquid crystal display device.

First, we will explain a history and technical background which led us to make the present invention. In the art of producing LCD devices including backlights, it has been commonly believed that the LCD devices must be designed to have airtight construction preventing the penetration of dust and dirt. The conventional LCD devices have been relatively small display panel provided with a relatively small light diffusion plate having a relatively small elongation by the effect of heat from the lamps, so the deflection and wrinkling of the light diffusion plate is negligible and does not cause a considerable unevenness of brightness of the LCD panel. Recently, there has been a rising demand for LCD devices having a larger display panel and a thinner thickness, which requires the use of a light diffusion plate having a larger working surface and thinner in depth size. On the other hand, the light diffusion plate having a large surface and thin depth has reduced rigidity and may considerably deflect and wrinkle by the effect of heat generated from the backlight, resulting in unevenness of distances from the light diffusion plate to the LCD panel and the backlight. The diffusion plate comes into contact with the LCD panel and causes considerable uneven brightness of the panel. In addition, the conventional LCD device comprising two chambers partitioned by a light diffusion plate may involve a problem of generating a considerable difference between pressures in the lamp side chamber and the panel side chamber owing to the increase in temperature and pressure in the lamp chamber by heat from the lamps. In view of the fact that the differential pressure causes the light diffusion plate to camber, the present invention provides a LCD device in one embodiment wherein the possibility of generating a difference of pressures in the panel side chamber and the lamp side chamber is dissolved by communicating the two chambers with each other.

The present invention also provide a LCD device in another embodiment which allows the lamp side chamber and the panel side chamber to communicate with each other and also with the ambient air through technical means for reliably preventing the penetration of dust and dirt from the outside. This overthrows the premise of airtight construction of the conventional LCD device.

A liquid crystal display device according to an embodiment of the present invention will be described below in detail with reference to accompanying drawings. FIGS. 2A and 2B illustrate the construction of a LCD device according to an embodiment of the present invention. FIG. 2A is a plan view of the LCD device excluding a LCD panel, an optical sheet and a light diffusion plate when viewing from the LCD panel side. FIG. 2B is illustrative of a liquid crystal display device including a LCD panel, an optical sheet and a light diffusion plate, which is a section taken on the line A—A in FIG. 2A. Referring to FIGS. 2A and 2B, the LCD device is mainly composed of a shield portion 1, a light diffusion plate 2, an optical sheet 3, lamps 5, a reflecting sheet 6 and a LCD panel 7. In the shown construction, the shield portion 1 is formed of a sheet made of, e.g., aluminum or magnesium, which has a reflecting portion of rectangular shape opposed to the lamps 5, a rising portion perpendicularly rising from four sides of the reflecting portion to the level higher than that of the lamps 5, a marginal portion 12 bent outwardly from the rising portion (i.e., in a direction reverse to the inner wall surface of the rising portion opposed to the lamps 5) extending substantially in parallel with the reflecting portion and having at least a vent (through hole) 1a made therein and a most marginal portion 13 rising from the marginal portion 12. The shield portion accommodates lamps 5 therein.

The light diffusion plate 2 is formed in the shape of a rectangular sheet made of, e.g., PMMA (acryl) or PC (polycarbonate), which is mounted on the marginal portion 12 of the shield portion. The light diffusion plate 2 is mounted at its portion (hereinafter referred to as marginal portion of the light diffusion plate 2) on the marginal portion 12 of the shield portion and has at least a vent (through hole) 2a made in the marginal portion to match with the vent 1a made in the marginal portion of the shield portion.

The optical sheet 3 is a rectangular sheet made of material having polarizing property, which has the same size as that of the light diffusion plate 2 and is mounted at its portion (hereinafter referred to as marginal portion) on the marginal portion 12 of the shield portion 1 to regulate incident light from the lamps 5 to the LCD panel 7. This optical sheet 3 also has in its marginal portion at least a vent (through hole) 3a which matches with the vent 1a provided in the shield portion.

The light diffusion plate 2 and the optical sheet 3 are formed in such a manner that they can be arranged inside the most marginal portion 13 of the shield portion and their movement can be restricted by the most marginal portion 13 (as shown in FIG. 2B). The function of the optical sheet 3 is dependent on what kind of the LCD panel 7 is used. In other words, this sheet 3 may be omitted if the LCD panel 7 does not require regulation by the optical sheet.

The lamps 5 are formed by a plurality of fluorescent lamps or light-emitting diodes. Lamps 5 are supported by lamp holders (not shown) and arranged crosswise or lengthwise in opposition to a reflecting sheet 6 (to be described later) laid on the reflecting surface portion of the shield portion 1.

The reflecting sheet 6 is made of material having a high reflectance, e.g., PET (polyethylene terephthalate) containing high reflectance material. This sheet is placed at least on the reflecting surface portion of the shield portion.

The LCD panel 7 may be a transmissive type LCD panel, e.g., generally usable TFT (thin film transistor) LCD panel provided at its periphery with a frame 8 having means of fixing to the shield portion 1. In the description of the LCD panel 7, a term "effective light-emitting area" is used for specify a panel surface area through which light generated from a backlight can transmit and a term "ineffective light-emitting area" is used to specify a panel surface area through which the light cannot transmit. In the shown case, the place in which the LCD panel frame 8 is arranged corresponds to the ineffective surface area.

The LCD device thus constructed is assembled as follows:

The reflecting sheet 6 is placed on the reflecting portion of the shield portion 1, then the lamp holders (not shown) are attached to specified places of the shield portion 1 and the lamps are fixed to the respective holders.

The lamps 5 are now arranged opposite to the reflecting sheet 6 at a specified distance from the sheet 6.

The light diffusion plate 2 and the optical sheet 3 are mounted on the marginal portion 12. The plate 2 and sheet 3 are now arranged apart by a specified distance from the lamps 5 and opposite to the reflecting sheet 6. A backlight of the LCD device is thus formed.

The frame 8 of the LCD panel 7 is fixed onto the most marginal portion 13 in such a manner that light from the light diffusion plate 2 and/or the optical sheet 3 can transmit through the LCD panel 7. The LCD device is thus assembled.

In the above embodiment, the light diffusion plate 2 and the optical sheet 3 are fixed to the marginal portion 12 of the shield portion 1 by means of pressing parts (not shown) in such a manner that the plate 2 and the sheet 3 can slightly move (it is not completely fixed and is slightly movable when applying an external force thereto). The above-mentioned semi-fixing structure allows the light diffusion plate 2 and the optical sheet 3 to always keep a constant spacing from the lamps 5 and the LCD panel 7 and freely elongate by the effect of heat from the lamps 5. This semi-fixing structure is not limited to the above-described pressing parts provided on the LCD panel side and can be implemented by using collar head screws (not shown) which may be provided on the marginal portion 12 of the shield portion 1 to movably lock the optical sheet 3.

Figure 3:
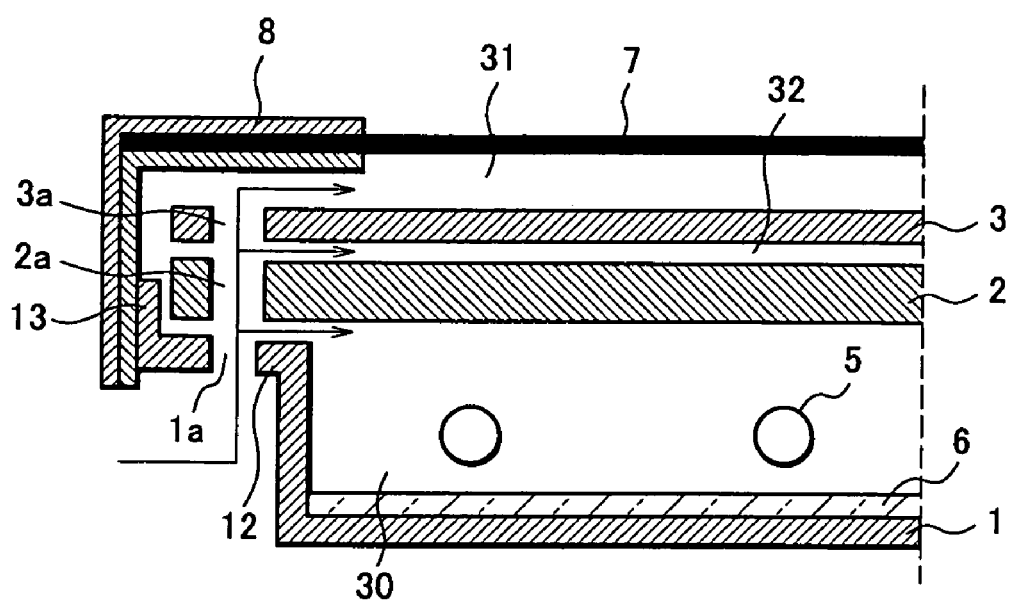
FIG. 3 shows the detailed construction of vents provided in a light diffusion plate and so on, and the ventilation of a liquid crystal display device according to an embodiment of the present invention.

FIG. 3 shows the detailed construction of vents provided in a light diffusion plate 2 and so on, and the ventilation of a liquid crystal display device according to the present invention. In FIG. 3, there is shown vents 1a, 2a and 3a made in periphery of a shield portion 1, a light diffusion plate 2 and an optical sheet 3 respectively. There is also shown a lamp chamber 30 formed between the light diffusion plate 2 and reflecting sheet 6, a LCD panel chamber 31 formed between the light diffusion plate 2 or the optical sheet 3 and the LCD panel 7 and a small space 32 formed between the light diffusion plate 2 and the optical sheet 3. However, the space 32 is not formed in case when the plate 2 and sheet 3 are assembled in close contact with each other.

The arrangement of the vents in this embodiment will be described further in detail. In the embodiment shown in FIGS. 2A and 2B, vents are provided, not in all of four-side marginal portions but only in one of four-side marginal portions of the shield portion 1, the light diffusion plate 2 and the optical sheet 3, which side is disposed up in vertical direction of the LCD device which is installed for example on a wall or a desk.

Referring now to FIGS. 2A, 2B and 3, the functions and effects of the vent system of the LCD device according to the present invention will be explained below. The lamp chamber 30 and the LCD panel chamber 31 are communicating with each other through the vents 2a and 3a and further with the ambient air through the vent 1a. Namely, the lamp chamber 30, the LCD panel chamber 31 and the space 32 communicate with the ambient air to attain the same air pressure.

Since the lamp chamber 30 and the LCD panel chamber 31 are partitioned by the diffusion plate 2 but communicate with each other through the vents, air heated by lamps 5 and so on in the lamp chamber 30 has a high temperature and a high pressure attains the same temperature and pressure as air in the LCD panel chamber 31. With an elapse of time, the lamp chamber 30 and the LCD panel chamber 31 can attain the same temperature and pressure as the ambient air has. Therefore, the diffusion plate 2 and/or the optical sheet 3 can be free from deformation under the differential pressure between both chambers 30 and 31. Furthermore, by-lamps-heated high-temperature air in the lamp chamber 30 is cooled down by the ambient air entered through the vent, so the thermal expansion of the light diffusion plate 2 is reduced.

In the LCD device according to the embodiment shown in FIG. 2A, the vent system is provided in the upper marginal portion of the device (i.e., the LCD device can always be mounted with its vents upward (FIG. 2A) irrespective of the wall mounting type or desk mounting type), whereby high-temperature air heated by heat from lamps 5 in the lamp chamber 30 flows upward to the vents and therefore the pressures in the lamp chamber 30 and the LCD panel chamber 31 quickly become the same. Although the light diffusion plate 2 is shown in FIG. 2B as closely contacted with crank-shaped marginal part 12 of the shield portion 1, there is in fact provided, as described before, the marginal portion 12 and the light diffusion plate 2 are semi-fixed and there is an opening between them, therefore the air of lamp-accommodating chamber 30 through above-mentioned opening and the vent 2a in the light diffusion plate 2 flows into the LCD panel chamber 31.

FIGS. 4A and 4B illustrate another exemplary construction of a liquid crystal display device of the present invention. FIG. 4A is a plan view of the LCD device viewed from the LCD panel side in the state that a LCD panel, an optical sheet and a light diffusion plate are removed for the sake of illustration. FIG. 4B is a section taken along the line A—A of FIG. 4A, wherein the LCD device includes the LCD panel, the optical sheet and the light diffusion plate. In FIGS. 4A and 4B, components identical to those in FIGS. 2A and 2B are given like characters and the same explanations are also applied to them.

To reliably communicate the inside of the lamp chamber 30 and the LCD panel chamber 31 partitioned by the light diffusion plate 2, a plurality of vents 1a, 2a and 3a are provided in the upper and lower marginal portions of a shield portion 1, a light diffusion plate 2 and an optical sheet 3 respectively. It is also possible to provide vents in all (four-sided) marginal portions of each component since the marginal portions are out of the effective screen surface of the LCD device.

FIGS. 5A and 5B illustrate another exemplary construction of a liquid crystal display device of the present invention. FIG. 5A is a plan view of the LCD device viewed from the LCD panel side in the state that a LCD panel, an optical sheet and a light diffusion plate are removed for the sake of illustration. FIG. 5B is a section taken along the line A—A of FIG. 5A, wherein the LCD device includes the LCD panel, the optical sheet and the light diffusion plate and the optical sheet. In FIGS. 5A and 5B, components identical to those in FIGS. 2A and 2B are given like characters and the same explanations are also applied to them. In FIGS. 5A and 5B, a shield portion 1 has protrusions 1b integrally formed at periphery of each of vents 1a. Each protrusion 1b is a cut-and-raised part formed when the vent 1a is cut in the marginal portion of the shield portion 1. In the embodiment shown in FIGS. 5A and 5B, the shield portion 1 has six vents 1a in six marginal positions and four protrusions 1b formed at the periphery of four vents 1a in four corners thereof, which protrusions 1b penetrate the respective vents 2a and 3a made in a light diffusion plate 2 and an optical sheet 3 respectively. Therefore, the protrusions 1b serve as locators of the shield portion 1, the light diffusion plate 2 and the optical sheet 3. As the shield portion 1, light diffusion plate 2 and optical sheet 3 can be assembled together by locating their vents 1a, 2a and 3a with least misalignment by the protrusions 1b shown in FIGS. 5A and 5B, it is possible to reliably communicate the lamp chamber 30 and the LCD panel chamber 31 with the ambient air. Although the embodiment shown in FIGS. 5A and 5B has protrusions 1b provided in four marginal corners of the shield portion 1, it can be modified to have protrusions only in the upper marginal corners of the shield portion. In this modification, the upper protrusions 1b extend through respective vents 2a and 3a of the light diffusion plate 2 and the optical sheet 3 so as to suspend the above-mentioned plate and sheet. In comparison with the construction of supporting the lowest marginal parts of the light diffusion plate 2 and the optical plate 3 by the most marginal portion 13 of the shield portion 1 as shown in FIG. 2B, this suspension type supporting construction makes the light diffusion plate 2 and the optical sheet 3 free from deflection by their own weight, keeping the flatness of their surfaces.

FIGS. 6A and 6B illustrate another exemplary construction of a liquid crystal display device of the present invention. FIG. 6A is a plan view of the LCD device viewed from the LCD panel side in the state that a LCD panel, an optical sheet and a light diffusion plate are removed for the sake of illustration. FIG. 6B is a section taken along the line A—A of FIG. 6A, wherein the LCD device is shown including the LCD panel, the optical sheet and the light diffusion plate. In FIGS. 6A and 6B, components identical to those in FIGS. 2A and 2B are given like characters and the same explanations are also applied to them. In FIGS. 6A and 6B, this embodiment has the shield portion 1 with protrusions 1b which are similar in construction and function to the protrusions 1b of the embodiment of FIGS. 5A and 5B and to which the same explanation is applied.

In the embodiment shown in FIGS. 6A and 6B, vents 1a, 2a and 3a are formed in the shape of a rectangle having its long sides in the transverse direction of the components in the LCD device, which direction is the horizontal direction of the LCD device while it is used. Namely, the shield portion 1, the light diffusion plate 2 and the optical sheet 3 are provided in their upper and lower marginal portions with rectangular holes having long sides disposed crosswise and short sides disposed lengthwise in the respective components. The arrangement of rectangular vents in marginal portions of the shield portion 1, the light diffusion plate 2 and the optical sheet 3 do not reduce the effective surface of the LCD panel even when the vents were made of large length for example in the transverse direction in the upper and lower marginal portions of the above components and when the components are assembled with a small amount of misalignment. Thus, when the LCD device is assembled with an allowable relative displacement of the components, the lamp chamber 30 and the LCD panel chamber 31 are reliably communicated with each other through the vents leading to the ambient air.

FIGS. 7A and 7B illustrate a further exemplary construction of a liquid crystal display device of the present invention. FIG. 7A is a plan view of the LCD device viewed from the LCD panel side in the state that a LCD panel, an optical sheet and a light diffusion plate are removed for the sake of illustration. FIG. 7B is a section taken along the line A—A of FIG. 7A, wherein the LCD device is shown including the LCD panel, the optical sheet and the light diffusion plate. In FIGS. 7A and 7B, components identical to those in FIGS. 6A and 6B are given like characters and the same explanations are also applied to them. To reliably communicate the inside chambers of the LCD device with each other and further with the ambient air through the vent system, it is preferably to make vents 1a, 2a and 3a of possibly large size or accurately align the vents with one another when assembling the components. However, the large vents may involve a problem of introducing dust and dirt into the inside of the LCD device through the vents. Therefore, the embodiment shown in FIGS. 7A and 7B uses mesh type filters 33 fitted externally onto the vents 1a in the shield portion 1, which can separate dust and dirt from air flowing into the LCD device through the vents 1a.

FIGS. 8A, 8B and 8C illustrate a still further exemplary construction of a liquid crystal display device of the present invention. FIG. 8A is a plan view of the LCD device viewed from the LCD panel side in the state that a LCD panel an optical sheet and a light diffusion plate are removed for the sake of illustration. FIG. 8B is a section taken along the line A—A of FIG. 8A, wherein the LCD device is shown including the LCD panel, the optical sheet and the light diffusion plate. FIG. 8C is a section taken along the line B—B of FIG. 8A. In FIGS. 8A–8C, components identical to those in FIGS. 6A and 6B are given like characters and the same explanations are also applied to them.

In the embodiment shown in FIGS. 8A to 8C, the shield portion 1 has protrusions (cut-and-bent pieces) 1b and vents 1a and communication hole 1a' in marginal portions 12. The vents 1a are similar to those of the embodiment shown in FIGS. 6A and 6B and similar in size to the vents 2a and 3a provided in the light diffusion plate 2 and the optical sheet 3. The vents 1a also communicate with the ambient air in the similar manner as those shown in FIGS. 6a and 6B. The communication hole 1a' made in the shield portion in the same direction as the protrusion was formed, which hole is connected with the vent 1a at a bent part 26 of the shield portion 1.

A lamp chamber 30 surrounded by the light diffusion plate 2 and the reflecting sheet 6 communicates through the communication hole 1a' and the vents 2a and 3a (in the light diffusion plate 2 and the optical sheet 3) with the LCD panel chamber 31 located on the front side of the light diffusion plate 2. The above vent system of the embodiment allows high-temperature and high-pressure air in the lamp chamber 30 to flow into the LCD panel chamber 31, thereby a differential pressure occurred between the both chambers can be quickly removed. As described before with reference to FIGS. 2A and 2B, both chambers 30 and 31 can communicate with each other merely through vents 1a provided in the shield portion 1, the provision of the communication hole 1a' can clearly establish the air passage between the lamp chamber 30 and the LCD panel chamber 31. The vents 1a also communicate with the ambient air, so it can further quickly achieve the uniformity of inside air pressure and temperature in the both chambers 30 and 31 of the LCD device.

As is apparent from the foregoing, a liquid crystal display device with a backlight disposed behind a LCD panel according to an embodiment of the present invention has a lamp chamber 30 and a LCD panel chamber 31, which are partitioned by a light diffusion plate 2 and/or an optical sheet 3 and connected with each other through a vent system capable of relieving a differential pressure between the both chambers and preventing the deformation of the light diffusion plate 2 and the optical sheet 3. Furthermore, the vent system can easily achieve the uniform temperature and pressure of air in and out of the LCD device by communicating the inside chambers with the ambient air. Although the described embodiment has vents 1a, 2a, 3a provided in the upper marginal portion or the lower marginal portions of the shield portion 1, the light diffusion plate 2 and the optical sheet 3, it is also possible to further provide vents in the right and/or left marginal portions of the above components if a heat source such as a lamp driving electronic circuit and transformer are mounted thereabout.

A liquid crystal display device according to another embodiment of the present invention is capable of preventing the occurrence of deflection of its light diffusion plate and optical sheet under a differential pressure between by the light diffusion plate and/or the optical sheet-partitioned lamp chamber and a LCD panel chamber by reliably communicating both chambers with each other through a vent passage which can be reliably established by using protrusions formed on the shield portion. The protrusions formed on the shield portion are capable of relieving the misalignment between the vents in the light diffusion plate and the optical sheet to the most and reliably communicating the respective chambers of the LCD device.

It is also possible to provide vents of rectangular shape in marginal portions of the shield portion, the light diffusion plate and the optical sheet, which can reliably establish a vent passage for communication of the lamp chamber with the LCD panel chamber even if the vents might be misaligned to a certain degree with each other when the above components are assembled. It is further possible to provide each open vent at its outside with a filter to prevent penetration of dust and dirt into the inside of the LCD device.

The invention claimed is:

1. A liquid crystal display device, comprising a plurality of lamps, a shield portion for accommodating the lamps, a light diffusion plate and/or an optical sheet, respectively, mounted on a marginal portion of the shield portion, a liquid crystal display panel disposed opposite to one side of the light diffusion plate and/or the optical sheet opposed each with the other side to the lamps, wherein the shield portion is provided with a vent in at least a marginal portion for communication with ambient air, the light diffusion plate and/or the optical sheet are provided each with a vent made in a marginal portion opposite to at least a part of the vent provided in the marginal portion of the shield portion, and a lamp chamber located in the lamp-accommodating side of the light diffusion plate and/or the optical sheet and an LCD panel chamber located in the LCD panel-disposing side of the light diffusion plate and/or the optical sheet communicate with each other through the vent of the light diffusion plate and/or the optical sheet and the vent in the marginal portion of the shield portion and at the same time with the ambient air through a passage formed by the vents.

2. The liquid crystal display device as defined in claim 1, wherein the marginal portion of the shield portion is provided with a protrusion extending through the vents provided in the light diffusion plate and/or the optical sheet and the light diffusion plate and/or the optical sheet are located in position on the shield portion with the protrusion inserted into the vents provided in the light diffusion plate and/or the optical sheet.

3. A liquid crystal display device as defined in claim 1, wherein the vents in the light diffusion plate and/or the optical sheet are rectangular openings each having long opposite sides disposed crosswise in the upper marginal portion of the shield portion and short opposite sides disposed lengthwise in the upper marginal portion of the shield portion.

4. The liquid crystal display device as defined in claim 1, wherein the vent made in the marginal portion of the shield portion is provided with a filter for protection against the penetration of dust and dirt from the outside.

5. The liquid crystal display device as defined in claim 1, wherein the shield portion has at the periphery of the vent a protrusion formed by bending a cutout piece extending from the shield portion, the protrusion is inserted into the vents provided in the light diffusion plate and/or the optical sheet for locating the light diffusion plate and/or the optical sheet, the shield portion has a communication hole made in the same direction as that of the protrusion and communicating with the lamp chamber and the LCD panel chamber.

6. The liquid crystal display device as defined in claim 3, wherein the vent made in the marginal portion of the shield portion is provided with a filter for protection against the penetration of dust and dirt from the outside.

7. A liquid crystal display device, comprising a plurality of lamps, a light diffusion plate and/or an optical sheet, a shield portion for accommodating the lamps, the light diffusion plate and/or the optical sheet, a liquid crystal display panel disposed opposite to one side of the light diffusion plate and/or the optical sheet opposed each with the other side to the lamps, wherein the light diffusion plate and/or the optical sheet are provided each with a vent, and a lamp chamber formed in the lamp-accommodating side of the light diffusion plate and/or the optical sheet and an LCD panel chamber formed in the LCD panel-disposing side of the light diffusion plate and/or the optical sheet communicate with each other through the vent of the light diffusion plate and/or the optical sheet.

8. A liquid crystal display device, comprising a plurality of lamps, a light diffusion plate and/or an optical sheet, a shield portion for accommodating the lamps, the light diffusion plate and/or the optical sheet, a liquid crystal display panel disposed opposite to one side of the light diffusion plate and/or the optical sheet opposed each with the other side to the lamps, wherein the light diffusion plate and/or the optical sheet are provided each with a vent, furthermore the shield portion is provided with a vent for communication with ambient air, and a lamp chamber formed in the lamp-accommodating side of the light diffusion plate and/or the optical sheet and an LCD panel chamber formed in the LCD panel-disposing side of the light diffusion plate and/or the optical sheet communicate with the ambient air through the vents of the light diffusion plate and/or the optical sheet and the shield portion.

9. The liquid crystal display device as defined in claim 8, wherein the vents in the light diffusion plate and/or the optical sheet are rectangular openings each having long opposite sides disposed crosswise in the upper marginal portion of the shield portion and short opposite sides disposed lengthwise in the upper marginal portion of the shield portion.

10. The liquid crystal display device as defined in claim 8, wherein the vent made in the marginal portion of the shield portion is provided with a filter for protection against the penetration of dust and dirt from the outside.

* * * * *